Feb. 9, 1932.  C. P. BYRNES  1,844,867
REGENERATOR SYSTEM
Filed Dec. 4, 1930    3 Sheets-Sheet 1

INVENTOR
Clarence P. Byrnes

Feb. 9, 1932.  C. P. BYRNES  1,844,867
REGENERATOR SYSTEM
Filed Dec. 4, 1930   3 Sheets-Sheet 2

INVENTOR
Clarence P. Byrnes

Feb. 9, 1932.  C. P. BYRNES  1,844,867
REGENERATOR SYSTEM
Filed Dec. 4, 1930  3 Sheets-Sheet 3

INVENTOR
Clarence P. Byrnes

Patented Feb. 9, 1932

1,844,867

UNITED STATES PATENT OFFICE

CLARENCE P. BYRNES, OF SEWICKLEY, PENNSYLVANIA

REGENERATOR SYSTEM

Application filed December 4, 1930. Serial No. 500,002.

I have invented a new and useful improvement in regenerator systems, of which the following is a full, clear and exact description, reference being had to the accompanying drawings forming part of this specification, in which.

This application is a continuation in part of my application Ser. No. 525,853, filed December 30, 1921, for regenerator systems. The form shown in Figures 1 to 3, inclusive is the preferred form of this application, although the broader claims are not limited thereto.

The invention relates to regenerative furnaces, particularly open-hearth steel furnaces, although it may be applied to any furnace having single-surface regenerators.

The object of the invention is to increase the efficiency of the regenerators by more efficient heat transfer in the checkerwork which is contacted with by the outgoing gases and the incoming fluid to be heated, such as air or gas or both.

Figure 1:
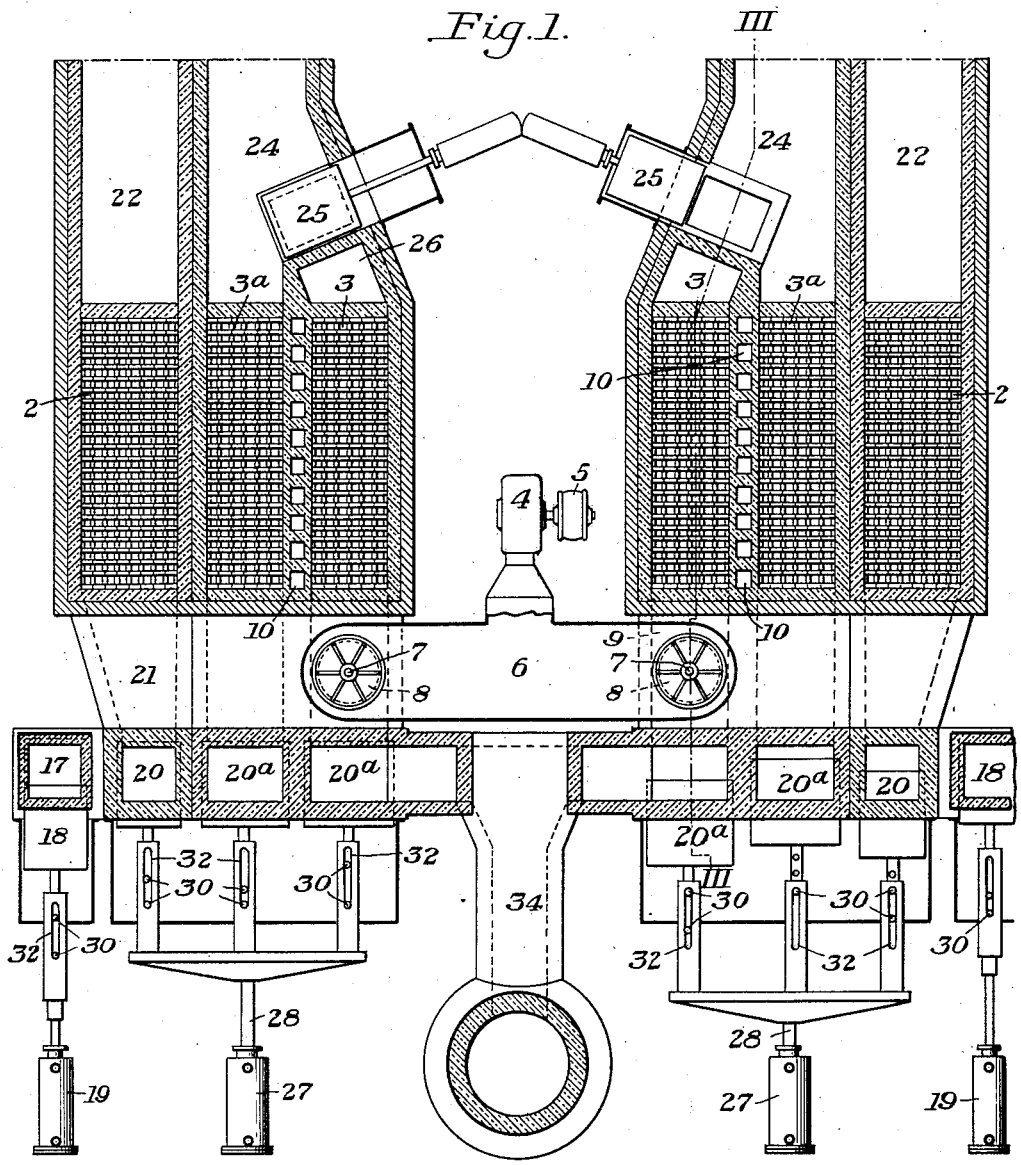
Figure 1 is a sectional plan view showing one form of the invention.
Figure 2:
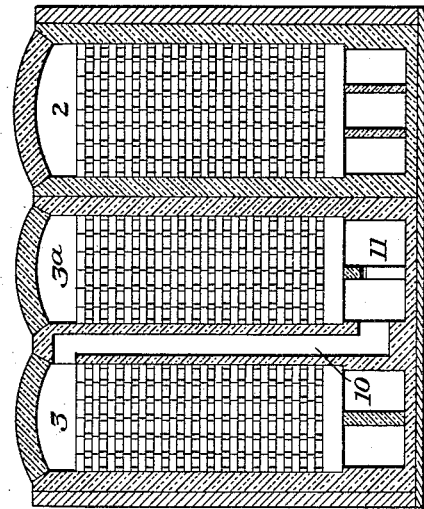
Figure 2 is a vertical cross section through the regenerators.
Figure 3:
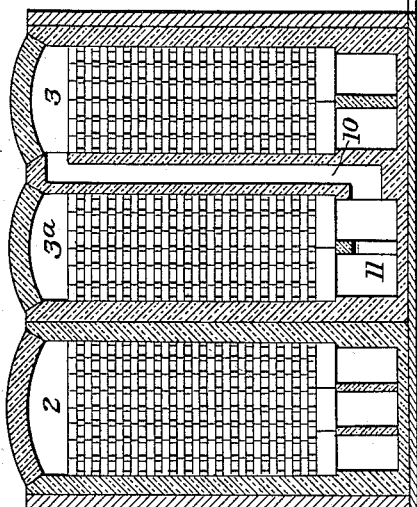
Figure 3 is a section on the line III—III of Figure 1.
Figure 3:
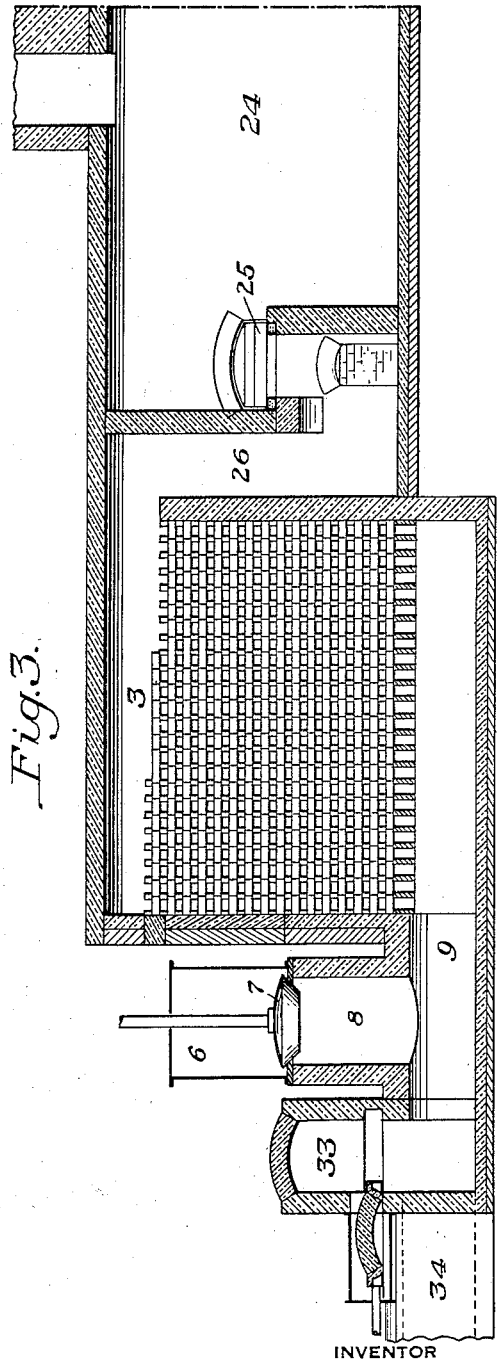

In the drawings, referring to the form of Figures 1, 2 and 3, a form of the invention is shown which is intended for regenerating both air and gas. These figures show only the regenerators and necks leading to the slag pockets with portions of the slag pockets, it being understood that the slag pockets are connected to the furnace in any well known manner.

These figures illustrate two sets of air and gas regenerative chambers, one set being adapted to heat the incoming air and gas, while the other set is receiving heat from the waste gases, these operations being reversed on each reversal of the furnace. These sets of regenerative chambers will be referred to with respect to their arrangement in these drawings, as the left and right regenerators.

The numeral 2 designates the gas regenerative chamber in each set, while 3 and 3a are the air regenerative chambers in each set. Air is supplied by blower 4, driven by motor 5 and feeding air to an overlying air box or manifold 6 having downwardly seating air control valves 7, one for each set of regenerators, controlling the air flow to the down air conduits 8, as shown in Figures 1 and 3. From these conduits, channels 9 lead to the bottom of the first checker chamber 3 of each set of regenerators. From the upper part of the first chamber 3, the air passes down through a channel or channels 10 between the air checker chambers to the bottom part 11 of chamber 3a, and thence rises through the checkerwork therein to the upper portion thereof and thence into the flue 24. The gas fed through an overhead flue passes down through flue 17, shown in Figure 1, to a sliding gas valve 18, operated by cylinder 19. After passing the valve 18, the gas flows horizontally underneath sliding valve 20 and through flue 21 into the gas regenerator 2. Passing through the regenerator, it enters the neck 22 and thence passes to the slag pocket and furnace.

Similarly, the air after making two upward passes through the two checkerwork chambers of the air regenerator passes from the top of the second checker into neck 24, and thence through the slag pocket to the furnace.

In the drawings, the left hand regenerators are shown as connected to the incoming end of the furnace, the air valve 7 for these regenerators being raised, the gas valve 17 being open, and the outlet regulating valves 20, 20a being closed. The inlet valve 25 for the waste gases from the neck to this left hand set of air regenerators is also closed. This valve 25 controls the passage of outgoing gases to the checker chambers 3 of the air regenerators.

In the form shown, the right hand set is connected to the outgoing end of the furnace, the gases of combustion entering through the necks 22 and 24. The gases entering the neck 24 pass partly through the air checker chamber 3a and partly through the valve 25 and passageway 26 to the top of the checker chamber 3. The outlet gases coming through neck 22 enter the gas regenerator 2; and the outlet gases therefore flow in parallel through the three checker chambers 2, 3 and 3a. From these three chambers, the outlet gases pass to the valves 20 and 20a. The valves 20a are actuated by cylinder 27 and pistons 28, and these valves have adjustable connections, as does also valve 18. These adjustments may comprise pins 30, adapted to be inserted at will in any manner in a series of openings in the inner rods or stems of the valves. These pins extend through slots 32 in the connections, so that the extent of opening of the valves is easily controlled by changing the position of the pins 30, to vary the lost motion before the valves are operated. By these adjustments, the volume of outflowing gases passing in parallel through the chambers 2, 3 and 3a can be regulated so that the correct proportion or volume of gas shall pass through each chamber. The valve 20, therefore, controls the amount of waste gas which passes through the gas checker; while the valve 20a regulates the relative distribution of the waste gas between the chambers 3 and 3a. In the right-hand portion of Figure 1, I have shown these valves 20 and 20a as open, but to different amounts, thus illustrating the regulation to give proper distribution of gas among the chambers.

As shown in Figure 3, a branch flue 33 extends over valves 20 and 20a and leads to the stack flue 34, which is preferably beneath the floor level.

The entry of the waste gases to flue 33 is, of course, controlled by the valves 20 and 20a. The valves 18, 20 and 20a are preferably formed of a cast iron surrounding frame which is water-cooled and contains an arched refractory cover or filling. The inlet valves 25 are preferably of the same nature, although they may be water-cooled to a greater extent. The valve seats on which they slide in a horizontal direction are also preferably water-cooled and formed of hollow castings.

It will be noted that while the air valves are in their normal position between the regenerative checkerwork and the stack and while there is reversal of flow through all checker chambers on the change from heating incoming gases to heating the checker by outgoing waste gases, yet the entering air flows in series through a plurality of checker chambers, while the outgoing gases flow in parallel through the checker chambers on reversal. It will also be noted that in the preferred form shown, the air being heated rises through each checker chamber. This gives far more efficient heat absorption from the heated checkerwork than where the air flowing in series passes down through one checker and thence up through another, although my broader claims are not limited to this preferred form. It will also be noted that on reversing the regenerators, the flow of fluid through all checker chambers is reversed in the sense that the flow of gaseous fluid therethrough is changed in direction from that prior to reversal. It will also be noted that there is no air valve located between the regenerative chambers, as shown for example in the Slick patent, No. 1,247,020, granted November 20, 1917, wherein the waste gases pass over a closed air valve and thence through additional checkers in the horizontal flue; and wherein the flow of heating gases in some of the checkers is in the same direction as that of the air passing through the checkers. It will also be noted that there is no need or requirement for passing waste gases in tandem through checkers or checker chambers in the present case: these waste gases flowing in parallel through all checkerwork in the preferred form.

Figure 4:
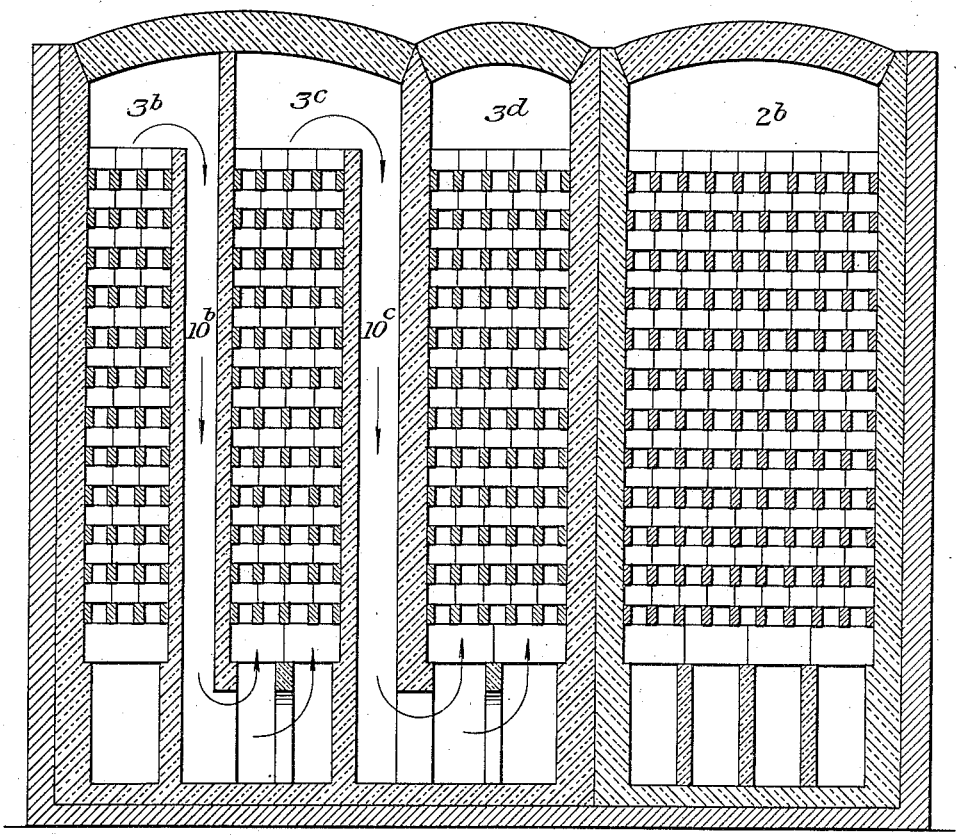
Figure 4 is a vertical section showing a portion of regenerative checkers of a somewhat modified form.

Figure 4 shows a slightly modified form wherein there are three checker chambers 3b, 3c and 3d; 2b being the gas checker. In this case, the passage or passages 10b are repeated in 10c between the second and third air checker chambers in the air chamber series. The general arrangement here is the same as that in Figures 1, 2 and 3, except that the valve 25 controls the flow of outgoing waste gases through both the checker chambers 3b and 3c.

The advantages of my invention will be plain to those skilled in the art, since a better heating efficiency is obtained than in the prior practice. The heating gases are reversed, as compared to the gases to be heated, since they pass in a different direction through the checkerwork. The air enters each checkerwork at a different point from the entry of waste gases thereinto, and the course of the air to be heated differs from that of the heating gases in each checker.

The outgoing gases are given ample space for their large volume due to their temperature, while at the same time these products are distributed more efficiently over the colder parts of the regenerator checkers. A higher velocity is preferable for the incoming air or mixture than for the outgoing gases.

The air may be forced or sucked through the checkerwork by means of fans or air pumps located either between the regenerative chambers and the furnace or beyond the regenerative chambers. It will be noted that during air heating at least one of the air checkers is closed off from direct communication with the waste gas flue by valve 25, thus compelling the air to flow in series through successive checkers; while during the reverse period, such valve device is open and the waste gases have direct access to both or all checkers, thus giving parallel flow.

The number of checkers may be varied, different valve or control systems may be used, and other changes may be made without departing from my invention.

I claim:

1. A single surface regenerator system having a plurality of air heating checkers, an air inlet port to one of said checkers, a series air connection leading from the checker having the air inlet to another of said air heating checkers, both said checkers having hot waste gas inlets arranged in parallel and spaced apart from their air inlets, reversing valve mechanism, and control mechanism for closing the hot waste gas inlet to the air checker having the air inlet during periods of heating air in said checkers and for opening it in the waste gas heating periods thereof, whereby flow through said checkers is reversed and the air flow through said checkers is in series while the waste gas flow through said checkers is in parallel.

2. A single surface regenerator system having a plurality of air heating checkers, an air inlet port to one of said checkers, a series air connection leading from the checker having the air inlet to another of said air heating checkers, both said checkers having direct inlets in parallel for hot waste gases from a furnace separate from their air inlets, reversing valve mechanism, control mechanism for closing the hot waste gas inlet to the air checker having the air inlet during periods of heating air in said checkers and for opening it in the waste gas heating periods thereof, whereby flow through said checkers is reversed and the air flow through said checkers is in series while the waste gas flow through said checkers is in parallel, and means for proportioning the relative parallel flow of waste gases through the several checkers during heating up thereof.

3. A single surface regenerator system having a plurality of air heating checkers, an air inlet port to one of said checkers entering its lower portion, a series air connection leading from the checker having the air inlet to the lower portion of another of said air heating checkers, both said checkers having direct inlets in parallel for hot waste gases from a furnace separate from their air inlets, reversing valve mechanism, and control mechanism for closing the hot waste gas inlet to the air checker having the air inlet during periods of heating air in said checkers and for opening it in the waste gas heating periods thereof, whereby flow through said checkers is reversed and the air flow through said checkers is in series while the waste gas flow through said checkers is in parallel.

4. In the operating of single surface regenerators, the steps consisting of passing waste gases from a furnace outwardly in parallel through a pair of regenerators and then reversing the flow therein, closing off one of the pair from the waste gases and feeding air to be heated inwardly through the regenerator which is closed off and thence in series through the other regenerator.

5. In the operating of single surface regenerators, the steps consisting of passing waste gases from a furnace outwardly in parallel through a pair of regenerators and then reversing the flow therein, closing off one of the pair from the waste gases and feeding air to be heated inwardly and upwardly through the regenerator which is closed off and thence in series through the other regenerator.

6. In the operating of single surface regenerators, the steps consisting of passing waste gases from a furnace outwardly in parallel through a pair of regenerators and then reversing the flow therein, closing off one of the pair from the waste gases and feeding air to be heated inwardly and upwardly through the regenerator which is closed off and thence upwardly in series through the other regenerator.

In testimony whereof I have hereunto set my hand.

CLARENCE P. BYRNES.